United States Patent Office 2,966,526
Patented Dec. 27, 1960

2,966,526

METALATION REACTIONS

Virgil L. Hansley, Charles E. Frank, and John F. Nobis, Cincinnati, Ohio, assignors to National Distillers and Chemical Corporation, New York, N.Y., a corporation of Virginia No Drawing. Filed July 31, 1957, Ser. No. 675,244

17 Claims. (Cl. 260—665)

The present invention relates to a novel process for preparation of alkali metal derivatives of organic compounds containing an active hydrogen atom replaceable by an alkali metal atom and, additionally, to such a process wherein the alkali metal derivatives are converted to highly valuable substances, particularly organic acids.

In recently developed processes, conjugated aliphatic diolefins or vinyl aromatic compounds are reacted with an alkali metal under conditions to effect selective dimerization of the diolefin or vinyl aromatic compound. Such conditions include use of the alkali metal in finely divided form, a selected ether reaction medium, a temperature preferably below about 0° C. and use of a small amount of a polycyclic aromatic compound and/or a solid, friable attrition agent, or both, as disclosed in copending applications, S.N. 333,354, filed January 26, 1953, now abandoned; S.N. 382,456, filed September 25, 1953, now Patent No. 2,816,916, issued December 17, 1957; S.N. 394,497, filed November 25, 1953, now Patent No. 2,816,913, issued December 17, 1957; and S.N. 398,218, filed December 14, 1953, now Patent No. 2,816,917, issued December 17, 1957. Thus, in the use of finely divided sodium for reaction with butadiene in the presence of dimethyl ether at a temperature of below about 0° C., such a process can be carried out in such a manner that selective formation of a mixture of isomeric disodiooctadienes is effected and which mixture can be reacted with carbon dioxide to form the dialkali metal salts of $C_{10}$ unsaturated acids which can then be hydrogenated to the corresponding saturated salts which, upon acidification, results in liberation of an isomeric mixture of $C_{10}$ aliphatic saturated diacids, including sebacic acid, 2-ethylsuberic acid and 2,5-diethyladipic acid, usually in a weight ratio of about 4:5:1, respectively. Similarly, in the reaction between the alkali metal and styrene, diphenylbutane is selectively produced and which upon carbonation is converted to the corresponding dialkali metal salts of diphenyladipic acid.

The present invention is based on the discovery that if the aforedescribed process is carried out in presence of an organic substance containing an active hydrogen atom, or such an organic substance is added to the dimer product of selective reaction between the alkali metal and diolefin or vinyl aromatic compound, a highly effective conversion occurs whereby the active-hydrogen atom is replaced by an alkali metal atom. To effect such an effective reaction, however, certain controlled conditions must be employed including the residence time for contact of the organic substance containing the active hydrogen atom and the amount of said organic substance employed with respect to the diolefin or vinyl aromatic reactant. As is described more fully hereinafter, when reference is made herein to residence time, it is intended to include the period of time which the organic substance is in contact with the diolefin or vinyl aromatic undergoing dimerization reaction with the alkali metal or the period of time of contact of the organic substance with the dimer product of reaction of the alkali metal and diolefin or vinyl aromatic in cases wherein the organic substance is added subsequent to the reaction of the alkali metal with the diolefin or vinyl aromatic. Thus, in accordance with this invention, an organic substance such as toluene can be metalated to benzylsodium which can be carbonated to ultimately yield phenylacetic acid; propylene can be metalated to yield allylsodium which can be carbonated to yield vinylacetic acid; butene can be metalated to butenyl sodium which can be carbonated to ultimate production of methyl vinylacetic acid; 2-heptene can be metalated to heptenylsodium with ultimate production via carbonation, to mixed octenoic acids; benzene can be metalated to phenylsodium to ultimate production of benzoic acid; p-xylene can be metalated to p-methylbenzyl sodium to ultimate production of p-tolylacetic acid; 1-phenyl-2-butene can be metalated to 1-phenyl-1-sodio-2-butene to ultimately yield, by carbonation, 2-phenyl-3-pentenoic acid; furan can be metalated to α-furylsodium which can be carbonated to furoic acid, and others. Thus, the organic substance containing an active hydrogen atom can be an aliphatic monoolefin containing at least three carbon atoms, an aromatic hydrocarbon, an alkyl aromatic hydrocarbon, heterocyclic compounds that contain oxygen, nitrogen or sulfur in the ring, and others.

Accordingly, the following reactants and reaction conditions may be employed in practice of the present invention:

(1) An aliphatic conjugated diolefin, and preferably, such diolefins of from four to eight carbon atoms with specific examples including butadiene, isoprene, dimethyl butadiene, the pentadienes, as the methyl-1-3-pentadienes, and the like; styrene, ring-substituted styrenes such as ortho, meta and para methyl styrene, ethyl styrenes, and the like and, in general, alkyl ring-substituted styrenes in which the alkyl group or groups contain from one to four carbon atoms.

(2) An organic substance containing an active hydrogen atom; i.e., a hydrogen atom replaceable by an alkali metal atom. Included therein are compounds such as aliphatic monoolefins containing at least three carbon atoms including propylene, butenes such as butene-1 and butene-2, pentenes such as pentene-1 and pentene-2, hexenes such as hexene-1, -2, and -3, the heptenes, octenes, cycloalkenes such as cyclopentenes such as cyclopentene, cyclohexene, etc., aromatic compounds such as toluene, the xylenes such as p-xylene, and heterocyclic compounds such as furan, thiophine, pyridine, and others.

(3) An alkali metal in finely divided form. Suitable examples thereof include sodium and potassium with sodium being preferred as it provides excellent selectivity of reaction and yield of desired products and is cheaper and more readily available. Use of chemically pure sodium is not essential, however, as mixtures containing a substantial amount of sodium are useful as are alloys of sodium and potassium, of sodium and calcium, and of sodium and lithium. The alkali metal is employed in finely divided form as, for example, a dispersion of particles averaging less than about 50 microns in size with a preferred size being in the range of 1–10 microns, and less. The alkali metal dispersions are most conveniently prepared in a separate step preliminary to their use in the described reaction.

The reaction is carried out in an ether reaction medium. Such ethers can be any aliphatic mono ether having a methoxy group, in which the ratio of the number of oxygen atoms to the number of carbon atoms is not less than 1:4. Examples include dimethyl ether, methyl ethyl ether, methyl n-propyl ether, methyl isopropyl ether, and mixtures of these methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, and methyl butyl ethers. The simple methyl monoethers, as dimethyl ether, and the dimethyl and diethyl ethers of ethylene glycol are preferred.

The ethers should not contain any groups such as hydroxyl, carboxyl and the like which are distinctly reactive towards sodium. Although the ether may react in some reversible manner, it must not be subject to extensive cleavage, as such cleavage action destroys the ether, uses up sodium and introduces into the reacting system sodium alkoxides which, in turn, tend to induce rubber forming reaction with the diene rather than the desired reaction.

Although the reaction medium should consist essentially of the specified ethers, other inert media can be present in limited amounts. In general, these inert media will be introduced with the sodium dispersion as the liquid in which the sodium is suspended and will act chiefly as diluents. The concentration of ether in the reaction mixture should at all times be maintained at a sufficient level to have a substantial promoting effect upon the desired dimerization reaction.

In carrying out the reaction between the alkali metal and the aliphatic conjugated diolefin or vinyl aromatic compound as well as when such a reaction is carried out in presence of the organic substance containing an active hydrogen atom, a temperature of below about 0° C. is preferably employed with a preferred range being between —20 to —50° C. However, when the reaction between the alkali metal and diolefin or vinyl aromatic compound is initially carried out in absence of the organic substance containing the active hydrogen atom, and the latter substance is added following completion of the alkali metal-olefin dimerization reaction, the temperature of the mixture containing the added organic substance is preferably raised to expedite metalation by the dialkali metal dimer. Thus, the temperature may for example, be raised to 25° C. or higher, depending on the boiling point of the lowest boiling reactant, i.e., dimer product or the organic substance containing the replaceable hydrogen atom. Thus, following completion of the dimerization reaction and addition of the organic substance to be metalated, the temperature is preferably raised but is maintained below the boiling point of the lowest boiling reactant. Similarly, such temperature elevation can be used in the described in situ reaction following completion of the dimerization reaction so as to expedite the metalation of the organic substance present during the dimerization reaction. Moreover, in instances wherein it is desired to effect the metalation of the organic substance at an elevated pressure, higher temperatures may be used commensurate with boiling point characteristics, decomposition temperatures, etc. of the reactants and reaction products. For most satisfactory results, a residence time of three or more hours, such as four to six hours, is employed for the described metalation reactions although an appreciable amount of the desired reaction often occurs with a residence time of from about one-half to one hour.

For the reaction between the alkali metal and olefin, selectivity to dimerization is effected by carrying out the reaction in presence of a small amount of a compound of the polycyclic aromatic class or a solid, friable attrition agent, or both. The polycyclic aromatic compounds that serve as dimerization promoters include condensed ring hydrocarbons such as naphthalene and phenanthrene as well as the uncondensed polycyclic compounds such as diphenyl, the terphenyls, dinaphthyl, tetraphenyl ethylene and the like, and mixtures of such compounds. It is also intended to include mixtures of these compounds. The polyphenyl compounds such as diphenyl and the terphenyls and their mixtures have been found to be particularly useful. The amount of the hydrocarbon required will vary over a range which in every case will be relatively small in comparison with the amount of olefin undergoing reaction. The exact amount of any particular reaction will depend on temperature, time of reaction and the structure of the dimerizable olefin. Concentrations in the range of 0.1 to 10 weight percent based on the amount of the olefin are ordinarily quite sufficient.

In the use of a solid, friable attrition agent, the reaction can be carried out by adding a relatively coarse salt, or oxide or other suitable material to a pebble mill or ball mill or other type attrition reactor in contact with the dispersed metallic alkali metal and the reaction medium wherein the salt is simultaneously ground down to an effective particle size, or the attrition agent may be preground before introduction into the mill and/or before introducing alkali metal and other reactants. The former method is to be preferred in large scale industrial operations since the reaction of the alkali with the dimerizable olefin can be initiated substantially simultaneously with the start of the grinding action.

Amounts of the attrition agents in the range of 2.5 to 8 parts to one part of solid alkali metal have been found to be satisfactory, although smaller and larger amounts are effective but to smaller degrees, in the first place because of the limited attrition action, and in the second place because too much reactor volume is taken up by the attrition agent itself.

The attrition agent should be of an easily friable nature and should permit being ground readily to a particle size of at least $\frac{1}{10}$ the size of the alkali metal dispersion particles which are being used. For instance, for a solid metallic sodium dispersion of average particle size of 50 microns, the size of the particles of solid attrition agent should rapidly reach 5 microns or less under the attrition conditions.

Materials suitable for use as the solid attrition agent include inorganic solids such as alkali metal salts from the classes of the halides and sulfates, for example sodium chloride, potassium chloride, sodium sulfate, potassium sulfate, and the like. Also useful is the class of compounds which consists of metallic and non-metallic oxides which are not reactive with alkali metals under the conditions of the reactions. Thus, sand (silicon dioxide), diatomaceous earth (cellite), rutile, iron oxide, magnesia and alumina operate satisfactorily. Other materials, inert to the reaction, such as graphite, zircon and powdered coal, are also operable.

In preferred practice, a radio of at least three mols of the organic substance containing an active hydrogen atom is used per equivalent of the alkali metal in the dimerized product of the dimerization reaction. Thus, for example, where the dimerized product is disodiooctadiene, it is preferred to use at least six mols of said organic substance per mol of disodiooctadiene. However, ratios as low as one mol of the organic substance per equivalent of sodium may be used but a higher relative concentration of the organic substance is used to expedite its metalation by the alkali metal of the dimer product. Thus, for example, in instances wherein the organic substance containing an active hydrogen atom serves as a reaction medium, molar ratios of ten, or higher mols of the organic substance per equivalent of sodium may be used.

In order to further describe the invention, the following embodiments are set forth for purposes of illustration and not limitation.

*Example 1*

(A)

To a reaction medium of 1000 ml. of dimethyl ether and one gram atom of finely divided sodium as a 20% dispersion in mineral spirits and two grams of p-terphenyl, one gram mol of butadiene and three gram mols of propylene were added while maintaining the reaction mixture at a temperature of —25° C. to —30° C. The butadiene and propylene were added simultaneously at a rate of two grams per minute for the butadiene and 4.5 grams per minute for the propylene. Following completion of addition of the butadiene and propylene, the reaction mixture was stirred for 5½ hours at approximately reflux temperature (—25° C. to —30° C.), following which the mixture was poured onto an excess of crushed Dry Ice. Volatile organic material (dimethyl ether and $CO_2$) were then allowed to evaporate and the resulting dry salts were treated with steam and dissolved in water to destroy any residual sodium and to drive off any traces of volatile organic matter. The resulting solution of salts was then filtered and acidified with concentrated HCl to liberate the free acids from their salts. Extraction of the acids with diethyl ether, followed by stripping the ether from the extract, yielded a liquid product that was rapidly distilled under reduced pressure through a Vigreaux column to yield 65 grams of a low boiling material (neutralization equivalent 108.8) with a negligible amount of residue. The 65 grams of low boiling material (below 150° C. at 0.5 mm.) was then fractionated under vacuum (50 mm.) through a well-insulated Vigreaux column whereby there was obtained 46.3 grams of vinylacetic acid, a 54% yield based on the amount of sodium employed.

(B)

Another run was carried out in the manner described in Example 1(A), except that the amount of propylene was increased to 7.1 mols, the propylene was introduced in batch prior to addition of the butadiene (2.0 grams/minute), and the amount of dimethyl ether was decreased from 1000 to 500 ml. There resulted from such a run a yield of 46% of vinylacetic acid.

*Example 2*

(A)

To a reaction medium of 1000 ml. of dimethyl ether, one gram atom of finely divided sodium as a 20% dispersion in mineral spirits and two grams of p-terphenyl, one gram mol of butadiene was added at a rate of two grams per minute while maintaining the temperature at —25° C. At completion of addition of the butadiene, 3.0 mols of toluene was added batchwise and the mixture was stirred for 5½ hours at a temperature of —25° C. The resulting mixture was poured onto an excess of crushed Dry Ice, volatile organic materials (dimethyl ether and $CO_2$) were allowed to evaporate, and the resulting mixture of dry salts were treated with steam and dissolved in water to destroy the residual sodium and to drive off any traces of volatile organic matter. The resulting solution of salts was then filtered and acidified with concentrated HCl to liberate free acids from their salts. The free acids were taken up in diethyl ether and the residual aqueous layer extracted twice with diethyl ether. The combined organic solutions were stripped of ether by heat and suction.

Flash distillation of the residue at 1 mm. yielded 85 grams of a white, crystalline solid crude phenylacetic acid (59% crude yield) (M.P. 42° C.) which, after recrystallization from 40–60° petroleum ether, weighed 48 grams and melted at 76–77° C., and which was identified as pure phenylacetic acid in a 35% yield of pure acid based on the amount of sodium employed.

(B)

In another run, carried out in a manner described in Example 2(A), but in which the stirring and residence time of 5½ hours were eliminated, the yield of crude phenyl acetic acid decreased from 59% in Example 2(A) to 10% in this example.

(C)

In still another run, carried out in the manner of Example 2(A) but in which only 500 ml. of dimethyl ether was used, the toluene was introduced batchwise prior to the butadiene addition, and the 5½ hours stirring period was eliminated, a 44% yield of crude phenylacetic acid was obtained.

(D)

A run was carried out, in the manner of Example 2(A) except that the toluene was added prior to the butadiene, the dimethyl ether was used in an amount of 500 ml. and the final stirring was for 5 hours instead of 5½ hours. In this run, phenylacetic acid formed as a solid from its salt solution upon acidification. The solid material was recovered by filtration and, upon being dried, analyzed to a 67% yield of crude phenylacetic acid.

By employing the same procedure with the exception of doubling the amount of toluene and stirring for six hours, the yield of crude phenylacetic acid was increased to 71%.

(E)

To a reaction medium of 500 ml. of dimethyl ether and one gram atom of finely divided sodium as a 20% dispersion in mineral spirits and two grams of p-terphenyl, six gram mols of toluene were added batchwise, followed by addition of one mol of butadiene at 2 grams per minute, while maintaining the temperature at —25° C. Following addition of the butadiene, the mixture was stirred without refrigeration for six hours, during which time the dimethyl ether evaporated. For the last two hours the temperature of the mixture was maintained at room temperature. Processing of the resultant mixture by carbonation followed by subjecting the carbonated mixture to the procedure of Example 2(D) gave a yield of 85% pure phenylacetic acid.

*Example 3*

To a reaction medium of 500 ml. of dimethyl ether and one gram atom of finely divided sodium as a 20% dispersion in mineral spirits and two grams of p-terphenyl, six gram mols of furan was added batchwise, followed by addition of 1 mol of butadiene and two grams per minute, while maintaining the temperature at —25° C. Following addition of the butadiene, the mixture was stirred without refrigeration for six hours, during which time the dimethyl ether evaporated. For the last two hours the temperature of the mixture was maintained at room temperature. Processing of the resultant mixture by carbonation followed by subjecting the carbonated mixture to the procedure of Example 2(D) gave a yield of 52% of α-furoic acid, melting point 131–132° C.

*Example 4*

The metalation of toluene was carried out essentially as in Example 2(E) except that one mol of isoprene was substituted for the butadiene. By carbonating on Dry Ice and treating the resulting mixture as in Example 2(E), a 61% yield of phenylacetic acid was obtained.

*Example 5*

To a reaction medium consisting of 2000 ml. of dimethyl ether and 1000 ml. (10 mols) of toluene was added 1.35 gram atoms of sodium (finely dispersed in mineral spirits) and 6.0 grams of p-terphenyl. To this was added 135 grams (1.3 mols) of styrene over a period of 120 minutes at a temperature of —30° C. After the styrene addition was complete, the dimethyl ether was allowed to evaporate, and the resulting slurry allowed to stand two days. The mixture was then poured on Dry Ice and the volatile materials were evaporated in a hood. The residual salts were dissolved in hot water, cooled and filtered. Acidification of the filtrate with concentrated hydrochloric acid caused the precipitation of white phenylacetic acid, which on drying yielded 85 grams (48% yield) of phenylacetic acid.

Example 6

Five hundred ml. of methyl ether was charged into a cold one-liter, ball mill and two grams of o-terphenyl added along with 278 grams of ball-milled salt in isooctane (28% isooctane). A 50% sodium dispersion (1.04 gram atom) in isooctane was added and the internal temperature of the ball mill held at −30° C. A mixture of 61.5 grams butene-2 and 62 grams of butadiene was added to the ball mill over a period of three hours. After carbonation of the reaction mixture on Dry Ice and decomposition of any unreacted sodium with water, the acids were isolated by acidification and extraction with the ether. After separation by distillation there was obtained a 25% yield of monobasic acids arising from butene-2 metalation by disodiooctadiene along with 59% $C_{10}$ dibasic acids.

Example 7

To 400 ml. of dry methyl ether in a three-necked flask containing two grams of o-terphenyl and 0.75 gram atom of sodium dispersed in isooctane at −30° C. was added a 50:50 mixture of butadiene-butene-2 (0.5 mol each) over a period of 5½ hours. At the end of this time the reaction mixture was carbonated on Dry Ice. After evaporation of the carbon dioxide, the excess sodium was decomposed with steam and the water layer thus obtained was acidified to obtain the crude unsaturated acids. The mixture of acids was separated to give 47% monobasic acids (resulting from transmetalation of the butene by the disodiooctadiene) and 21.2% $C_{10}$ acids. In addition there was isolated 17.6% polybutadiene. In the absence of the butene, 70–80% yields of $C_{10}$ acids are normally obtained.

In still other runs carried out in accordance with this invention, an excess (3:1) of p-xylene and butadiene was reacted to ultimately yield p-tolylacetic acid; an excess (3:1) of 1-phenyl-2-butene and butadiene was reacted with butadiene to ultimately yield (73%) 2-phenyl-3-pentenoic acid; and an excess (3:1) of 2-heptene was reacted with butadiene with ultimate production in 46% yield of octenoic acids.

As is apparent from the foregoing, the process embodied herein enables the production in selectively high yields of alkali metal derivatives of organic substances having an active hydrogen atom with ultimate conversion of the metalated derivatives to highly valuable acids. Moreover, by the process embodied herein, certain economies are realized for production of such derivatives over some methods heretofore employed. For example, in one known method for preparation of benzylsodium, the following procedure is employed wherein two atoms of sodium and two chlorine atoms are required.

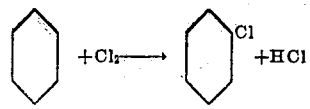

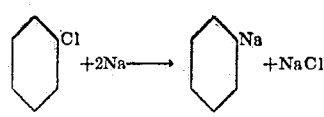

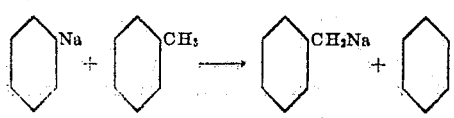

On the other hand, by the process embodied herein, a mol of benzylsodium can be prepared utilizing only one atom of sodium per mol of benzylsodium produced as per the following in which the preparation is shown via formation of disodiooctadienes by the reaction of sodium with butadiene in the described process.

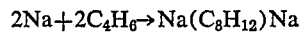

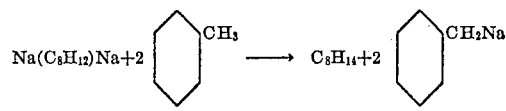

Thus, as is apparent therefrom, and has been found in practice of this invention, aliphatic dienes (such as octadienes when butadiene is used are by-products of the reaction, such by-products being dimers of the aliphatic conjugated diolefin employed. Specifically, use of butadiene results in a by-product comprising a mixture of 1,7-octadiene, 1,6-octadiene and 2,6-octadiene. On the other hand, when the dimerizable olefin is styrene, the by-product of the metalation reaction is 1,4-diphenyl-butane.

Example 8

In another series of runs, 2-butene was used as the active hydrogen-containing compound and butadiene as the aliphatic conjugated diolefin. In each case the reaction was carried out as follows:

A reactor was employed comprising a stainless steel vessel refrigerated by an outer jacket through which Dry Ice in methanol was circulated, a nitrogen blanketed Dry Ice condenser, a thermometer, appropriate feed inlets for reactants, and a stirrer.

The system, following purging with nitrogen, was cooled and charged with a defined quantity of dimethyl ether and sodium as a 20% dispersion in mineral spirits and two grams of p-terphenyl. With the vessel contents maintained at a temperature of −25° C. to −30° C., the butadiene and 2-butene were added either simultaneously or by prior addition of the 2-butene. The butadiene was always added at a rate of 2.0 grams per minute. The 2-butene (in cases where it was added simultaneously with the butadiene) at a rate sufficient to complete its addition in the same overall time required for the butadiene. In cases where the butene was added prior to the butadiene, it was passed in as rapidly as possible.

In certain of the runs, the mixture resulting upon completion of the additions to the reactor was carbonated immediately, whereas in other cases, the mixture was stirred for a defined period of time prior to being carbonated by pouring the mixture onto an excess of Dry Ice. Following the carbonation, the mixture was allowed to stand in an open hood until the bulk of the organic solvents evaporated. The resulting dry salts were treated with steam and dissolved in water to destroy any residual sodium and to drive off traces of volatile organic matter. The resulting solution was filtered and acidified with concentrated HCl, whereby organic acids separated out as a heavy yellow oil. The oil was dissolved in diethyl ether and the aqueous phase extracted with several portions of diethyl ether. The combined organic extracts were stripped of solvents and distilled rapidly through a Vigreaux column under reduced pressure (1 mm.). Material boiling below 150° C. at 0.5 mm. was classified as crude monobasic acids.

The following tabulation contains data on conditions under which the runs of this example were carried out. In all cases the sodium and butadiene were added in the ratio of one gram atom of Na:one mole of butadiene.

| Run No. | Mole Ratio, Butadiene: 2-butene | Order of Addition of 2-butene | Dimethyl Ether (ml.) | Final Stirring (After Addition of Butadiene and Butene) | Distillation Products | | | | | |
|---|---|---|---|---|---|---|---|---|---|---|
| | | | | | Foreshot—below 150° C. at 0.5 mm. | | | Middle Cut—(C₁₀ diacids) | | |
| | | | | | Grams | N.E. | Percent Yield | Grams | N.E. | Percent Yield |
| 1 | | pure butadiene | 1,000 | 0 | 7.1 | | 7 | 85.9 | 101.7 | 84 |
| 2 | | do | 1,000 | 4 | 10.2 | | 10 | 85.7 | 101.9 | 84 |
| 3 | 1:1 | with butadiene | 1,000 | 0 | 11.0 | | 11 | 85.1 | 102.0 | 83 |
| 4 | 1:1 | do | 1,000 | 0 | 10.9 | | 11 | 84.7 | 102.2 | 83 |
| 5 | 1:1 | do | 1,000 | 1 | 19.8 | | 20 | 79.0 | 104.0 | 76 |
| 6 | 1:1 | do | 1,000 | 3.5 | 32 | 184.8 | 17 | 81 | 104.4 | 78 |
| 7 | 1:1 | do | 1,000 | 4 | 18 | | 18 | 77.6 | 105.4 | 74 |
| 8 | 1:1 | do | 1,000 | 6 | 37 | | 37 | 61.7 | 104.6 | 59 |
| 9 | 1:3 | do | 1,000 | 0 | 70 | 110 | 63.5 | 32.6 | 143 | 23 |
| 10 | 1:6 | before butadiene | 500 | 5 | 67 | 103.8 | 65 | | | |
| 11 | 1:3 | with butadiene | 3,000 | 5 | 104 | 112.5 | 57 | 153.6 | 10 | 69.6 |

As is apparent from the foregoing data in Example 8, runs Nos. 1 and 2 using pure butadiene resulted in substantial production (84%) of diacids thereby evidencing that in the absence of an active-hydrogen-containing compound, the process did not result in metalation as embodied herein to derivatives which upon carbonation result in substantial formation of monobasic acids.

The data for runs Nos. 3 and 4 show that by use of equimolar ratios of butadiene and 2-butene, relatively high yields of diacids rather than monobasic acids were obtained when the carbonation was carried out after completion of the butene-butadiene addition. Although, as shown for runs Nos. 5 to 8, inclusive, maintaining the reaction mixture under stirring for an increasing period of time prior to carbonation increased the yield of monobasic acids with decreasing diacid formation, the monoacid yields were still relatively low. On the other hand, as shown by the data for runs Nos. 9 to 11, inclusive, practice of the invention embodied herein using an excess amount of the active hydrogen-containing 2-butene materially increased the formation of monoacids, thereby evidencing that effective metalation of the 2-butene occurred whereby subsequent carbonation and acidification converted the metalated 2-butene to monoacids. In connection therewith, the monobasic acid fraction of run No. 11 in the foregoing tabulation was hydrogenated at 500 p.s.i.g. of hydrogen and the hydrogenated product esterified with conventional methods using sulfuric acid as a catalyst. Fractionation of the esterified product resulted in ethyl esters of mixed $C_5$ monobasic acids and ethyl esters of mixed $C_9$ monobasic acids in yields of 48% and 13% respectively.

In the foregoing description of the process embodied herein, conversion of the metalation products to highly useful acids has been utilized to evidence by chemical means the formation of the metalated products in the described process. Other than carbonation to form acids, however, the metalated products can be subjected to other reactions such as with epoxides to produce primary alcohols; with aldehydes and ketones to produce primary, secondary or tertiary alcohols, and others.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for preparation of alkali metal derivatives of aliphatic monoolefins containing an active hydrogen atom replaceable by an alkali metal atom which comprises reacting in a liquid reaction medium (1) a dimerizable olefin from the group consisting of aliphatic conjugated dienes, styrene and styrene having an alkyl substituent for a nuclear hydrogen atom with (2) a finely divided alkali metal in the presence of a small amount, based on the weight of said dimerizable olefin, of a polycyclic aromatic hydrocarbon to selectively dimerize said olefin to dialkali metal dimers of said olefin, and contacting the resulting reaction mixture containing said dialkali metal dimers with an aliphatic monoolefin containing an active hydrogen atom replaceable by an alkali metal atom for a period of time sufficient to replace an active hydrogen atom of said aliphatic monoolefin with an alkali metal atom from said dialkali metal dimer.

2. A process, as defined in claim 1, wherein the olefin is butadiene, the alkali metal is sodium, the liquid reaction medium is dimethyl ether and the aliphatic monoolefin containing an active hydrogen atom is maintained in contact with the dialkali metal dimers for a period of at least about one-half hour.

3. A process, as defined in claim 2, wherein the selective dimerization reaction between the olefin and alkali metal is carried out at a temperature of below about 0° C.

4. A process, as defined in claim 2, wherein the reaction mixture containing the alkali metal dimers is contacted with the aliphatic monoolefin containing an active hydrogen atom in a ratio of at least one mole of said aliphatic monoolefin per equivalent of the alkali metal in the dialkali metal dimer.

5. A process, as defined in claim 4, wherein the dialkali metal dimer is contacted with said aliphatic monoolefin in a ratio of at least three mols of the organic substance per equivalent of the alkali metal in the dialkali metal dimer.

6. A process, as defined in claim 1, wherein the olefin is butadiene, the alkali metal is sodium, the liquid reaction medium is dimethyl ether, the selective dimerization reaction is carried out at below about 0° C., the dialkali metal dimers are contacted with the aliphatic monoolefin containing an active hydrogen atom in a ratio of at least three mols of said aliphatic monoolefin per equivalent of alkali metal in said dialkali dimer, and said aliphatic monoolefin is maintained in contact with the dialkali metal dimers for a period of at least about three hours.

7. A process for preparation of alkali metal derivatives of aliphatic monoolefins containing an active hydrogen atom replaceable by an alkali metal atom which comprises providing a reaction mixture comprising (1) a dimerizable olefin from the group consisting of aliphatic conjugated dienes, styrene and styrene having an alkyl substituent for a nuclear hydrogen atom, (2) a finely divided alkali metal, (3) a liquid reaction medium in which the olefin selectively dimerizes to dialkali metal dimers of the olefin, (4) an aliphatic monoolefin containing an active hydrogen atom replaceable by an alkali metal atom, and (5) a polycyclic aromatic hydrocarbon in a small amount, based on the weight of said dimerizable olefin, maintaining said mixture at a temperature at which the olefin is selectively dimerized to a dialkali metal dimer of said olefin and maintaining said aliphatic monoolefin containing an active hydrogen atom in contact with the dialkali metal dimer thus formed for a period of time sufficient for an alkali metal atom of said dimer to replace an active hydrogen atom of said aliphatic monoolefin.

8. A process, as defined in claim 7, wherein the reaction mixture is maintained at a temperature below about 0° C. to selectively dimerize the olefin in presence of the aliphatic monoolefin containing an active hydrogen atom, and the temperature of the resulting mixture containing the dimerized olefin and said aliphatic monoolefin is raised to expedite replacement of an active hydrogen atom of said aliphatic monoolefin by an alkali metal atom from the dialkali metal dimer of said olefin.

9. A process, as defined in claim 7, wherein the olefin is butadiene, the alkali metal is sodium, the liquid reaction medium is dimethyl ether and the aliphatic monoolefin containing an active hydrogen atom is maintained in contact with the disodio dimers of butadiene for a period of at least about one-half hour.

10. A process, as defined in claim 7, wherein the reaction during selective dimerization of the olefin is carried out at below about 0°C.

11. A process, as defined in claim 9, wherein the reaction mixture contains aliphatic monoolefin containing an active hydrogen atom in a ratio of at least one mole of said aliphatic monoolefin per equivalent of the alkali metal in the selectively formed dialkali metal dimers of the olefin.

12. A process, as defined in claim 11, wherein the reaction mixture contains the aliphatic monoolefin containing an active hydrogen atom in a ratio of at least three mols per equivalent of the alkali metal in the selectively formed dialkali metal dimer of the olefin.

13. A process, as defined in claim 7, wherein the olefin is butadiene, the alkali metal is sodium, the liquid reaction medium is dimethyl ether, the reaction during the selective dimerization is carried out at below about 0° C., the dialkali metal dimers thus formed are maintained in contact with the aliphatic monoolefin containing an active hydrogen atom for a period of at least about three hours, and the aliphatic monoolefin containing an active hydrogen atom is used in a ratio of at least about three mols per equivalent of alkali metal in the dialkali metal dimers.

14. A process for preparation of alkali metal derivatives of aliphatic monoolefins containing an active hydrogen atom replaceable by an alkali metal atom which comprises reacting in a liquid reaction medium (1) a dimerizable olefin from the group consisting of aliphatic conjugated dienes, styrene and styrene having an alkyl substituent for a nuclear hydrogen atom with a finely divided alkali metal in the presence of a solid, friable attrition agent to selectively dimerize said olefin to dialkali metal dimers of said olefin, and contacting the resulting reaction mixture containing said dialkali metal dimers with an aliphatic monoolefin containing an active hydrogen atom replaceable by an alkali metal atom for a period of time sufficient to replace an active hydrogen atom of said aliphatic monoolefin with an alkali metal atom from said dialkali metal dimer.

15. A process for preparation of alkali metal derivatives of aliphatic monoolefins containing an active hydrogen atom replaceable by an alkali metal atom which comprises providing a reaction mixture comprising (1) a dimerizable olefin from the group consisting of aliphatic conjugated dienes, styrene and styrene having an alkyl substituent for a nuclear hydrogen atom, (2) a finely divided alkali metal, (3) a liquid reaction medium in which the olefin selectively dimerizes to dialkali metal dimers of the olefin (4) an aliphatic monoolefin containing an active hydrogen atom replaceable by an alkali metal atom, and (5) a solid, friable attrition agent, maintaining said mixture at a temperature at which the olefin is selectively dimerized to a dialkali metal dimer of said olefin and maintaining said aliphatic monoolefin containing an active hydrogen atom in contact with the dialkali metal dimer thus formed for a period of time sufficient for an alkali metal atom of said dimer to replace an active hydrogen atom of said aliphatic monoolefin.

16. A process for preparation of butenyl sodium which comprises reacting butadiene with finely divided sodium in a dimethyl ether reaction medium in the presence of a small amount, based on the weight of butadiene, of a polycyclic aromatic hydrocarbon to provide a reaction mixture containing disodiooctadienes, and contacting the resulting reaction mixture containing said disodiooctadienes with butene for a period of time sufficient to replace an active hydrogen atom of the butene with a sodium atom from said disodiooctadienes.

17. A process for preparation of butenyl sodium which comprises providing a reaction mixture containing (1) butadiene, (2) finely divided sodium, (3) a polycyclic aromatic hydrocarbon in a small amount, based on the weight of butadiene, (4) butene and (5) dimethyl ether as a reaction medium, maintaining said reaction mixture at a temperature below about 0° C. to selectively dimerize the butadiene to disodiooctadienes, and maintaining the butene in said reaction in contact with the thus formed disodiooctadienes for a period of time sufficient to replace an active hydrogen atom of the butene with a sodium atom from said disodiooctadienes.

References Cited in the file of this patent

UNITED STATES PATENTS

| | | |
|---|---|---|
| 2,773,092 | Carley et al. | Dec. 4, 1956 |
| 2,816,913 | Frank et al. | Dec. 17, 1957 |
| 2,850,538 | Nobis et al. | Sept. 2, 1958 |
| 2,850,539 | Schott et al. | Sept. 2, 1958 |
| 2,865,953 | Nobis et al. | Dec. 23, 1958 |